June 4, 1968 H. J. QUEISSER 3,387,163

LUMINESCENT SEMICONDUCTOR DEVICES INCLUDING A COMPENSATED ZONE WITH A SUBSTANTIALLY BALANCED CONCENTRATION OF DONORS AND ACCEPTORS

Filed Dec. 20, 1965

INVENTOR
H. J. QUEISSER
BY H. W. Lockhart
ATTORNEY

United States Patent Office 3,387,163

Patented June 4, 1968

3,387,163

LUMINESCENT SEMICONDUCTOR DEVICES INCLUDING A COMPENSATED ZONE WITH A SUBSTANTIALLY BALANCED CONCENTRATION OF DONORS AND ACCEPTORS

Hans J. Queisser, Summit, N.J., assignor to Bell Telephone Laboratories, Incorporated, New York, N.Y., a corporation of New York Filed Dec. 20, 1965, Ser. No. 514,940

3 Claims. (Cl. 313—108)

ABSTRACT OF THE DISCLOSURE

A monocrystalline semiconductor body of the III–V compound type, such as gallium arsenide, contains a Group IV element, such as silicon, as the only significant impurity. By treatment of a portion of the body, a compensated zone is formed in which some of the Group IV element atoms become effective as significant impurities of the type opposite to that of their initial and major state. Thus a gallium arsenide body containing silicon is N-type, but when arsenic is outdiffused from a portion, a compensated zone is formed in which there is a substantial balance between silicon atoms functioning both as donors as originally present, and as acceptors replacing outdiffused arsenic. Such a compensated zone is an efficient source of luminescence when suitably excited.

Figure 1:
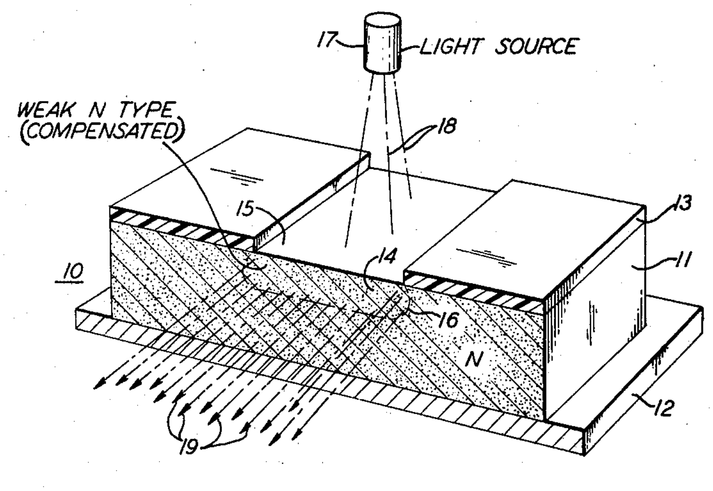

This invention relates to luminescent devices and particularly to intermetallic semiconductor crystals of the Group III–Group V type utilized as light emitters.

The occurrence of luminescence in III–V compound crystals is well known. In particular, such luminescence or emission of light is attributed to radiative recombination of charge carriers occurring, for example, at or near PN junctions or contacts. This process involves encounters within the semiconductor body between the two types of charge carriers, holes and electrons, in which the carriers effectively recombine and disappear with the emission of radiation. Accordingly, luminescent devices may employ any of several known methods for providing the carriers for recombination, thus differentiating among the phenomena of electroluminescence, photoluminescence, cathodoluminescence and others. It is desirable in all types of luminescent semiconductor devices to enhance the light emission characteristics or efficiency thereof.

Accordingly, an object of this invention is a luminescent semiconductor device and, in particular, one exhibiting desirable qualities of light emission.

The invention is based on the recognition that light generation and emission is enhanced in a III–V compound crystal, such as gallium arsenide, which includes a compensated portion within which radiative recombination occurs. More particularly, the compensated portion, in which donors and acceptors are approximately in balance, that is, in substantially equal numbers, contains a Group IV element as the only effective significant impurity. This amphoteric nature of certain Group IV elements is known and is utilized in connection with this invention to achieve an advantageous luminescent device.

Accordingly, in one aspect, the invention is embodied in a monocrystalline body of gallium arsenide including a compensated portion in which silicon is the effective impurity. Further, a light beam or other photon source is directed at the crystal in the vicinity of the compensated portion and luminescence is detected from the crystal.

In another aspect of the invention, the gallium arsenide crystal contains a compensated portion and an adjoining PN junction. Again, the crystal is doped with only a Group IV element present as an impurity. Electroluminescence then is generated within the compensated portion by the application of a forward bias across the PN junction.

Thus the invention involves a light-emitting element which also when suitably arranged as an optical maser may be adapted to provide coherent light. Such devices are of interest currently in a wide range of uses, particularly in the communication arts.

Figure 2:
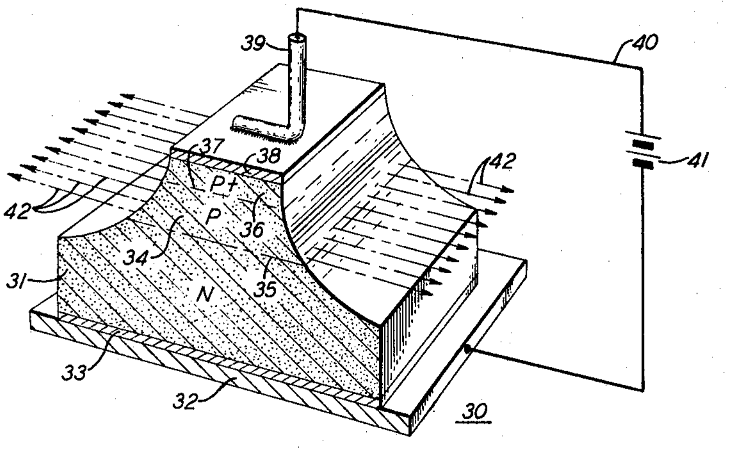

The invention and its particular features will be more clearly understood from the following detailed description taken with the drawing, in which:

FIG. 1 shows, in perspective and section, a photoluminescent device in accordance with the invention; and FIG. 2 shows a mesa type semiconductor PN junction electroluminescent device embodying the invention in another form.

The device 10 shown in FIG. 1 comprises a crystal 11 of monocrystalline N-type conductivity gallium arsenide having a relatively high doping concentration of silicon, in particular about $5\times10^{18}$ atoms per cubic centimeter. For illustrative purposes the crystal is attached to a mounting plate 12. The upper surface of the crystal 11, except for the central portion 15, is covered by a layer 13 of silicon oxide. The portion 14 of the crystal immediately adjoining the uncovered surface 15 is of a less heavily doped N-type material. In particular, the portion 14 is only weakly N-type or compensated material in which the donor and acceptor impurity concentration is substantially in balance.

A light source 17 is shown schematically in the figure mounted so as to direct a light beam 18 against the surface 15 adjoining the compensated portion 14 of the crystal 11. The impingement of this photon stream generates hole-electron pairs within the crystal and in particular within the compensated portion, wherein they then recombine to produce the luminescent radiation emitting from the crystal as indicated by the arrow-headed lines 19.

The compensated portion within the crystal is advantageously produced by heating the crystal 11 with the oxide masking layer 13 at a temperature of about 1050 degrees centigrade for approximately ten minutes. As a consequence of this treatment the portion 14 underlying the uncoated surface 15 undergoes a depletion of arsenic in the crystal lattice as a consequence of outdiffusion. Inasmuch as the crystal contains only silicon as a significant impurity the arsenic vacancies are occupied by silicon atoms acting as acceptors. This property of silicon and other Group IV elements of acting as both donors and acceptors in Group III–V semiconductors is particularly advantageous in connection with this invention inasmuch as it facilitates control of the formation of a compensated portion of the crystal. In particular, other amphoteric elements in addition to silicon are germanium and tin.

Under appropriate excitation, as is known in the art, the device of FIG. 1 will emit radiation in the invisible range, in particular, the infrared. By suitable arrangement, typically by providing reflective faces by cleaving the crystal, emission of coherent radiation may be achieved. Moreover, the wavelength of the emitted radiation appears to be a function of the doping level and degree of compensation in the portion 14. The degree of compensation refers to the extent to which the concentration of acceptors and donors departs from being in exact balance.

Moreover, the provision of a structure including both a heavily doped ($\geqslant10^{18}$ atoms per cubic centimeter) and a compensated portion involving an amphoteric impurity element results in a virtual reduction of the energy bandgap but with the Fermi level located so as to enable low energy, highly efficient light emission especially at temperatures near room temperature.

Another structural arrangement of the invention as an electroluminescent device is depicted in FIG. 2. Again a silicon-doped gallium arsenide crystal 31, originally in a form of a parallelepiped wafer, is heated to outdiffuse the entire upper portion of the wafer. Then, using suitable masking of the sides and bottom of the wafer, zinc is diffused into the top surface to produce the P+ zone 36. This high conductivity zone 36 is provided to enhance the making of low resistance contact. The intermediate portion 34 is of a graded P-type conductivity and defines a PN junction 35 with the original N-type crystal portion 31. In this embodiment the wafer further has been masked and etched to produce the mesa configuration for convenience in observing the light emission from the vicinity of the PN junction. A voltage source 41 is connected by way of the lead 40 to the connector 39 and mounting plate 32 to ohmic contacts 38 and 33, respectively, enabling application of a forward bias across the PN junction. Again the emission of visible light is indicated by the arrowed lines 42 originating in the region of the P-type zone 34 close to the junction. It is this particular portion which constitutes the compensated region resulting from the use of silicon-doped gallium arsenide. In this crystal, formation of the PN junction by conversion of conductivity type results from the more protracted heating of the silicon-doped gallium arsenide. In particular, heating at temperatures in the range from about 1000 to 1200 degrees centigrade for extended periods is used to accomplish such conductivity type conversion. As will be pointed out hereinafter, the degree of conversion may be affected also by the type and pressure of the ambient used. Unless otherwise specified, heat treatment to produce outdiffusion is done in a hydrogen atmosphere.

Although the invention has been described in terms of a specific embodiment utilizing gallium arsenide, it will be appreciated that other Group III–V compound semiconductors may be also used in conjunction with other Group IV elements as doping impurities. The important aspect to the unique light-emitting element described herein rests in the formation of a compensated portion in a crystal in which the significant doping impurity is selected from Group IV and is amphoteric in character. For example, Group III–V compounds such as gallium phosphide are also suitable, and dopants such as germanium and tin may be used in similar fashion as silicon described above.

Moreover, although the specific disclosure is in terms of photoluminescent and electroluminescent devices, cathodoluminescence may be utilized as well as in the practice of the invention.

In addition, crystals containing compensated portions suitable for the practice of this invention may be produced from a molten solution by freezing out in contact with a single crystal seed. Specifically, P-type gallium arsenide may be produced from a gallium rich silicon-doped melt. Conversion of a portion of the crystal to compensated form and to N-type then may be achieved by heat treating in an overpressure of arsenic.

Accordingly, although the invention has been described in certain specific terms, it will be understood that other arrangements may be devised by those skilled in the art which likewise fall within the scope and spirit of the invention.

What is claimed is:

1. A luminescent semiconductor device comprising a monocrystalline body selected from the group consisting of gallium arsenide and gallium phosphide, said body containing substantially only one effective significant impurity selected from the group consisting of silicon, germanium and tin, said body including a compensated portion in which the atoms of said effective significant impurity are present in substantially equal numbers as acceptors and as donors, said compensated portion adjoining a surface of said body for enabling emission of radiation from said compensated portion, and excitation means for providing hole-electron pairs in said compensated portion for radiative recombination therein.

2. A device in accordance with claim 1 in which said excitation means includes means for applying an electrical voltage in the forward direction across said body, said means comprising a zone of degenerate semiconductor material of the type opposite that of said major portion of said body in a surface portion of said body and an external electrical connection to said degenerate zone.

3. A device in accordance with claim 1 in which said excitation means includes radiation means.

References Cited

UNITED STATES PATENTS

| | | | |
|---|---|---|---|
| 2,683,794 | 7/1954 | Briggs et al. | 250—85 |
| 3,059,117 | 10/1962 | Boyle et al. | 330—4.3 X |
| 3,245,002 | 4/1966 | Hall | 331—94.5 |
| 3,267,294 | 8/1966 | Dumke et al. | 307—88.5 |

OTHER REFERENCES

Albrecht G. Fischer, "Injection Electroluminescence," Solid-State Electronics, Pergamon Press, 1961, vol. 2, pp. 242–244.

JAMES W. LAWRENCE, *Primary Examiner.*

P. C. DEMEO, *Assistant Examiner.*